United States Patent [19]
Marko et al.

[11] Patent Number: 5,482,233
[45] Date of Patent: Jan. 9, 1996

[54] DISMOUNTABLE, SLIDABLE TUBE SUPPORT CLIP FOR ACCOMMODATING HIGH-TEMPERATURE THERMAL EXPANSION

[75] Inventors: Myroslaw Marko, Westlake Village; Mohamad A. Dagher, San Dimas, both of Calif.

[73] Assignee: Rockwell International Corporation, Seal Beach, Calif.

[21] Appl. No.: 202,419

[22] Filed: Feb. 28, 1994

[51] Int. Cl.[6] .................................................. F16L 3/08
[52] U.S. Cl. .................... 248/73; 248/231.81; 248/901
[58] Field of Search .................... 248/225.31, 230, 248/231, 231.8, 73, 901; 52/506.01, 506.02, 506.03, 506.04; 62/300, 302; 165/76, 77, 78, 79

[56] References Cited

U.S. PATENT DOCUMENTS 3,907,239  9/1975  Ehrlich .................................. 248/229

Primary Examiner—Leslie A. Braun
Assistant Examiner—Gwendolyn Wrenn
Attorney, Agent, or Firm—George A. Montanye; Harry B. Field; Steven E. Kahm

[57] ABSTRACT

This invention provides an easily removable support clip for a solar receiver panel tube. A key feature of this concept is its easy assembly and disassembly without requiring access to the back side of the panel. Another key feature is the design of the clip can accommodate very severe thermal transients without exceeding the material's capacity to sustain these strains.

3 Claims, 3 Drawing Sheets

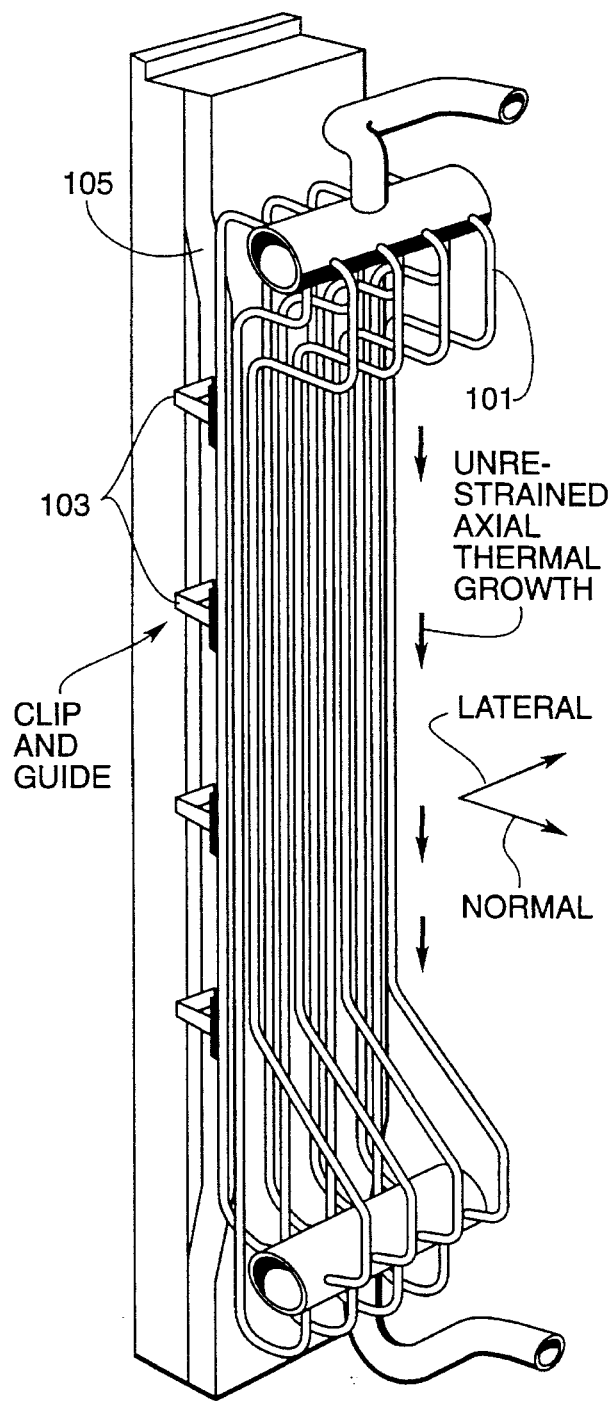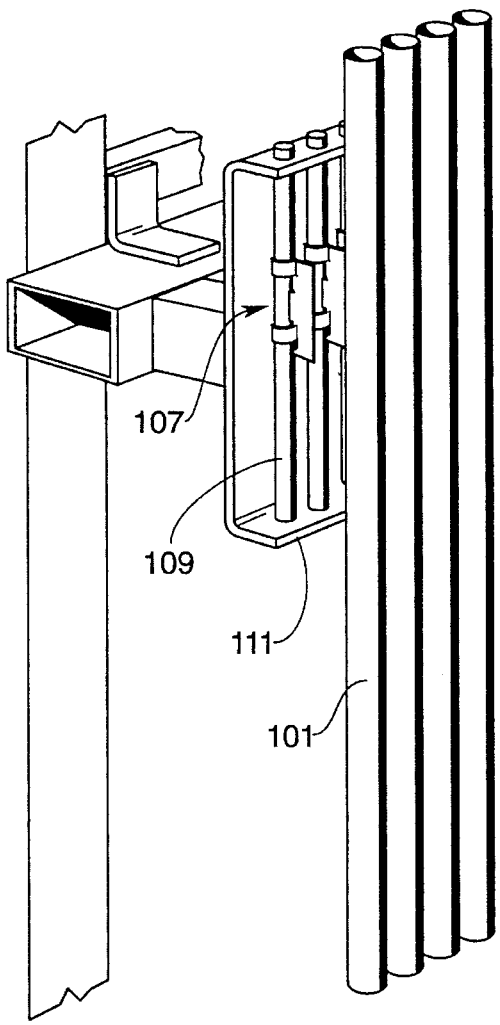
Fig. 1
SUPPORT ELEVATION
Fig. 2

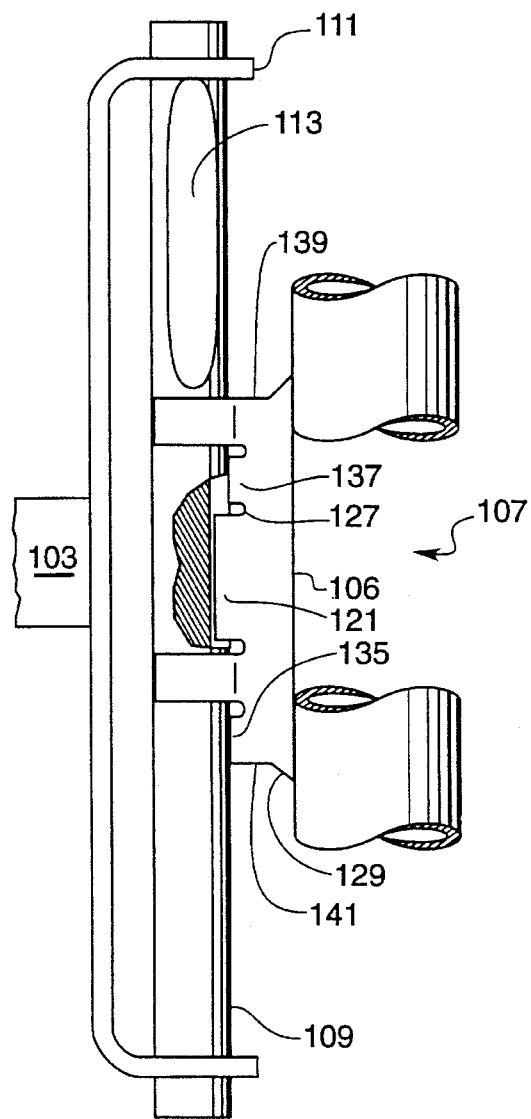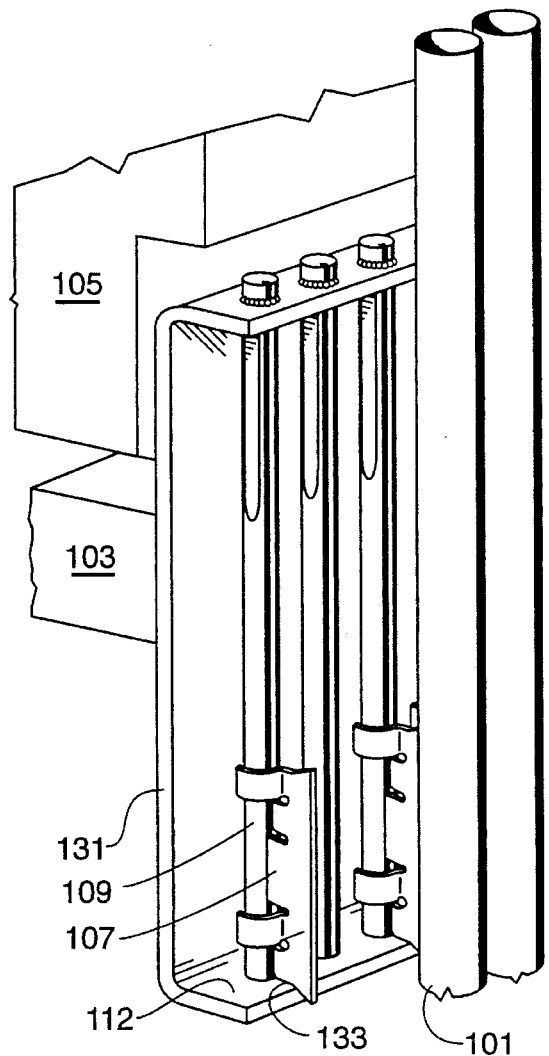

5,482,233

DISMOUNTABLE, SLIDABLE TUBE SUPPORT CLIP FOR ACCOMMODATING HIGH-TEMPERATURE THERMAL EXPANSION

BACKGROUND OF THE INVENTION

1. Field of the Invention

This invention relates to clips used to hold tubes which are subjected to high-temperature thermal tube expansion under severe thermal transient conditions such as found in solar concentrator panels.

2. Description of the Related Art

In the past molten salt solar receivers used clips welded to the back side of the solar absorption tubes combined with a buckstay support and tie rods or rollers to support the receiver's thermal insulation dead weight while providing the normal and lateral restraint required to take out the wind and seismic loads imposed on the receiver. These solar receivers provided for free axial thermal expansion of the tubes, however they had several drawbacks, for example, the weight of the thermal insulation and buck stay was transmitted to the tubes through only two clips, imposing very severe dead weight loads on those individual clips. These solar receivers could not accommodate tube-to-tube differential expansion as might occur due to solar flux gradients across the panel during low-power conditions. The clips were not designed to accommodate the severe thermal transients imposed when clouds passed over the receiver and eventually this would lead to leakage at the clip-to-tube location due to the severe thermal stresses. Further, some of the prior designs did not afford easy removal of individual tubes.

SUMMARY OF THE INVENTION

This invention provides an easily dismountable, high-temperature, axially slidable, and normally and laterally restrained tube support. It uses a slotted hinge configuration combined, with a key to enable assembly/disassembly over a shaped, grooved guide rod and provide the desired normal and lateral load capacity with only minimal frictional resistance to axial motion. The guide rod material is preferably a material such as Nitronic 60 to provide a high-temperature, galling-resistant, dissimilar sliding surface for the clip which is preferably a material compatible with the tube material such as 316H stainless steel.

The clip ends are chamfered and the clip is full penetration and fillet welded 125, to the tube 101, to eliminate high edge-type thermal stresses during the severe cloud-induced transients. The transition regions between the slotted hinge lobes are well rounded to minimize stress concentration. The panel backside thermal insulation weight is carried on the guide rod support structure. Another feature of the clip/guide invention is that the upper clip is used to support its portion of the panel's dead weight loads by simply resting its lower surface against the guide rod bracket, therefore the clip does not move but, it is still readily dismountable.

OBJECTS OF THE INVENTION

It is an object of the invention to provide tube removability without back-side access.

It is a further object of the invention to provide acceptable thermal stresses during severe thermal transients.

Other objects of the invention are to provide lateral and normal restraint, allow unrestrained longitudinal expansion, eliminate thermal insulation load from clip-to-tube joint, and provide for tube-to-tube differential expansion.

Other objects, advantages and novel features of the present invention will become apparent from the following detailed description of the invention when considered in conjunction with the accompanying drawing.

BRIEF DESCRIPTION OF THE DRAWINGS

FIG. 1 is an isometric view of the solar absorption panel assembly.

FIG. 2 is an isometric view of the tube clip bracket and guide.

FIG. 5 is a side view of the clip, guide rod, and bracket.

FIG. 6 is an isometric view of the support bracket, clip and guide rod. This figure shows the clip utilized as a support for the dead weight of the panel.

DETAILED DESCRIPTION OF THE PREFERRED EMBODIMENT

Figure 3:
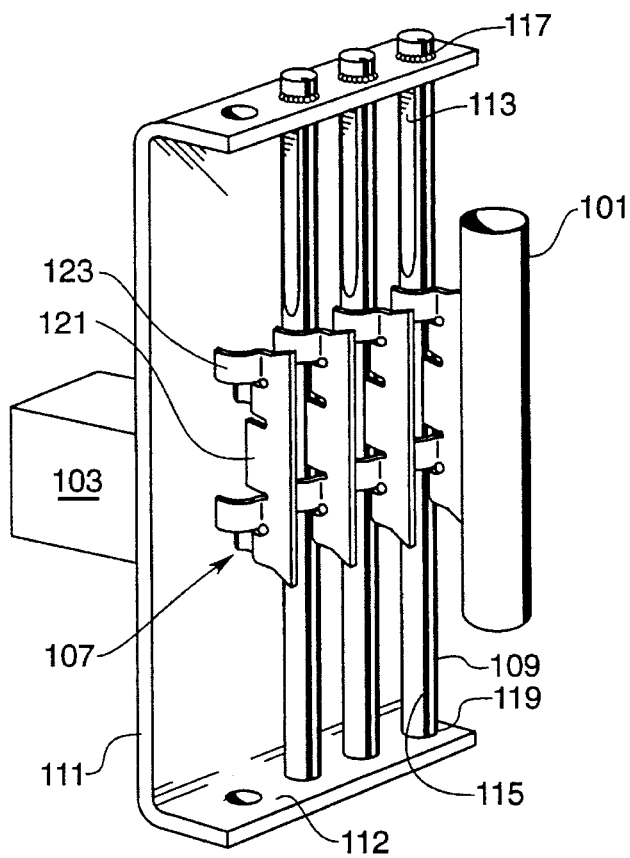
FIG. 3 is an isometric view of the clip, guide rod, and bracket assembly.

FIG. 1 shows the solar absorbrance panel, which is comprised of multiple array of solar absorption tubes, 101. The tubes are supported at the support elevation with slidable clips, 107 and guide rods 109, shown in FIG. 2. Thermal insulation 105 is shown mounted between the solar absorption tubes 101 and the panel structure, its load is carried by the guide rod support structure 103, as a result the thermal insulation 105 dead weight load is not transmitted to the tubes 101. The figure also shows that the tubes 101 have unrestrained axial growth and that the slidable clips 107 and guide rods 109 provide lateral and normal restraint of the tubes 101.

FIG. 2 shows the slidable clip, 107, its mounting onto the tube 101, and the mounting of the slidable clip 107, on a guide rod 109. The guide rod 109, which supports the slidable clip 107 is supported to take out normal and lateral loads through bracket 111.

FIG. 3 shows the assembly of the slidable clip 107, onto the guide rod 109. The slidable clip 107, is assembled to the guide rod 109, through the reduced section region called the assembly flats 113 and then lowered onto the restraining portion of the guide rods 109. As the slidable clip 107 is engaged over the assembly flats 113, the key 121 on the slidable clip 107, engages the groove 115, in the guide rod 109, this provides the lateral restraint feature of the clip design. The normal restraint feature of the slidable clip 107, and guide rod 109, is provided by the slotted hinge, 123. The guide rod 109 is preferably manufactured from a material like Nitronic 60 chosen to provide a galling-resistance to mate with the clip which is preferably a material like 316H stainless steel. This material combination provides, low friction coefficients, increased operating service and galling resistance. The guide rods 109 are secured to a bracket 111, through weld 117. The lower end of the guide rod 109 is a free end 119, which is free to expand and therefore does not provide thermal constraint. The bracket 111, transfers the imposed loads to support structure which is not shown. Weld 117, supports the guide rod 109, on bracket 111. The bracket has a ledge 112, having apertures for admitting the guide rods. The weld 117, also locates the guide rod within a bracket and takes out the friction loads that occur between the slidable clip 107, and the guide red 109.

Figure 4:
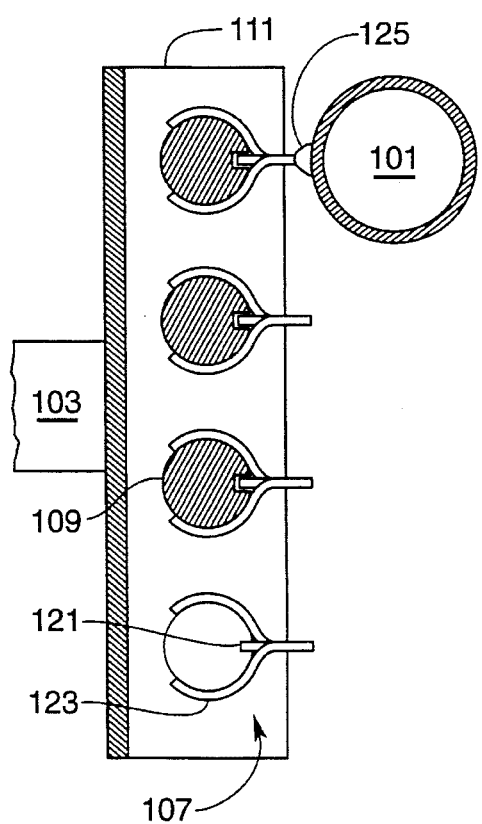
FIG. 4 shows an end view of the guide rods and clip with specific details for the slotted hinge and key. All four slotted hinges on the guide rod are shown.

FIG. 4 shows an end view of the slidable clip 107, guide rod 109, and a cross section through the tube 101. The main features shown in this figure are the key 121, and slotted hinge 123, shown engaged in the guide rod 109. Another feature is the full-penetration weld with fillet all around 125, which secures the slidable clip 107 to the tube 101. It is important to hold the length difference between the slotted hinge 123, and the key 121, to the minimum possible distance. This significantly/reduces the thermal stresses in the clip.

FIG. 5 shows the slidable clip 107, the guide rod 109, and the bracket 111, the chamfer 129, on the slidable clip 107, which is utilized to eliminate the very severe end stresses that would occur if the chamfer was not there when the clip is subjected to severe thermal transients. The full radius 127, in the slidable clip 107, also minimizes the thermal stresses that occur between the four lobes of the slotted hinge configuration 123. At least four lobes, two end lobes 135, and two center lobes 137, are required on the slotted hinge 123. The clip structure has a strong back 106, which transmits the lateral load from the key 121, and normal load and lateral loads from the end lobes 135, and the center lobes 137 to the tube 101. The clip also contains a shoulder 139, which is utilized to support the tube and panel from the support surface 133, shown on FIG. 6.

Each end lobe 135 has a slight taper 141, between the point of support on the support surface 133, shown on FIG. 6 and the end of the lobe to ensure that contact occurs as close to the tube 101, as possible.

FIG. 6 shows support bracket 131 having a support surface 133 on ledge 112, the slidable clip 107, is utilized as a dead weight support clip transmitting its load to the support bracket 131. In this manner, all of the clips on the panel are identical and this results in reduced costs. By cold springing the tube at initial assembly, all of the tubes load the support bracket uniformly at support surface 133.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A dismountable slidable tube support clip and guide rod comprising:

said guide rod having an assembly flat and a groove;

said slidable tube support clip for engaging the rod guide;

the slidable clip having a strongback with a key portion, the key portion being inserted into the groove on the rod guide;

at least two end lobes attached to the strongback, engaging the rod guide, at least two center lobes attached to the strongback, engaging the rod guide, a full radius on the lobes to minimize stress during severe thermal transients the strongback having chamfered ends to minimize stress during severe thermal transients.

2. A dismountable slidable tube support clip and guide rod as in claim wherein there is:

a support bracket having a top ledge and a bottom ledge with apertures receiving the guide rods in the ledges such that the single rods are inserted into the apertures, wherein the top ledge has the rod guide welded in place, the guide rods is free to move in the bracket ledge aperture so that there is no buckling of the guide rods due to a mismatch between the rod and the bracket.

3. A dismountable slidable tube support clip and guide rod as in claim 2 wherein, the slidable clip has an end lobe with a shoulder and a chamfer portion, wherein the shoulder of the end lobe, is supported by the support surface on the support bracket.

\* \* \* \* \*